United States Patent [19]

Verdy

[11] 4,279,565
[45] Jul. 21, 1981

[54] HOISTING APPARATUS FOR PLEASURE BOATS

[76] Inventor: Robert E. Verdy, 26, Avenue du Général-Leclerc, 64000 Pau, France

[21] Appl. No.: 941,081

[22] Filed: Sep. 11, 1978

[30] Foreign Application Priority Data

Sep. 15, 1977 [FR] France ............................ 77 27864

[51] Int. Cl.$^3$ .............................................. B60P 3/10
[52] U.S. Cl. .................................. 414/678; 414/459; 414/461; 414/673; 280/47.13 B; 280/62; 280/79.1 A; 280/414 B; 254/279
[58] Field of Search ............... 414/459, 460, 461, 626, 414/673, 678, 719; 114/263; 212/49; 280/47.13 R, 47.13 B, 47.34, 47.35, 62, 79.1 R, 79.1 A, 414 B, 755, 759; 269/17; 254/139.1

[56] References Cited

FOREIGN PATENT DOCUMENTS 1556340 12/1968 France .................................... 114/263
558795 1/1944 United Kingdom ...................... 269/17

Primary Examiner—Stephen G. Kunin
Assistant Examiner—Terrance L. Siemens
Attorney, Agent, or Firm—Gerald J. Ferguson, Jr.; Joseph J. Baker

[57] ABSTRACT

The invention relates to a hoist for boats. The hoist comprises two booms which are connected at one of their ends by a cross member. The hoist is supported by three wheels which are associated with only one boom and with the cross member, and a counterweight is located in the angle formed by this boom and this cross member. The invention can be used for lowering small pleasure boats into the water.

12 Claims, 4 Drawing Figures

HOISTING APPARATUS FOR PLEASURE BOATS

BACKGROUND OF THE INVENTION

The invention relates to an apparatus which serves to hoist small pleasure boats or, of course, any comparable craft so as to lower them into the water or lift them out of the water.

Hoisting apparatus are already known which are in use at numerous harbours, particularly pleasure harbours. The known apparatus have four wheels which, arranged in pairs, support a pair of booms held at a spacing from one another at one end by a cross member. Thus, viewed from above, the overall structure of such apparatus is U-shaped. In order to use the apparatus and remove a boat from the water, the apparatus is moved along on the opposite edges of a wet dock into which the boat can pass.

This means that the width of the wet dock has to be farily closely adapted to the wheel gauge of the hoisting apparatus.

It is an object of the invention to provide a boat hoisting apparatus suitable for use in a corresponding wet dock and which can be used simply from an angle of a wet dock or a quay where the boat can be berthed.

SUMMARY

An apparatus according to the invention comprises two booms held at a spacing at one of their ends by a cross member, the entire structure being supported by only three wheels associated with one of the booms and with the cross member, whilst the other boom has no wheels; at the same time, a counterweight is arranged in the part of the structure supported by the wheels, preferably in or near the angle formed by the boom and the cross member with which the wheels are associated.

BRIEF DESCRIPTION OF THE DRAWINGS

In order to show the advantages of the invention more clearly, an embodiment by way of example will now be described with reference to the accompanying drawings, wherein.

DESCRIPTION OF PREFERRED EMBODIMENTS

Figure 1:
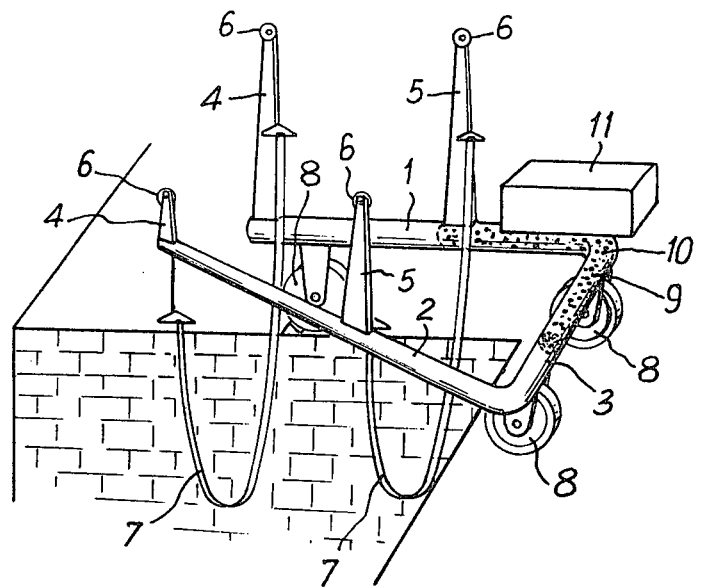
FIG. 1 is a general perspective view of a hoisting apparatus according to the invention.
Figure 2:
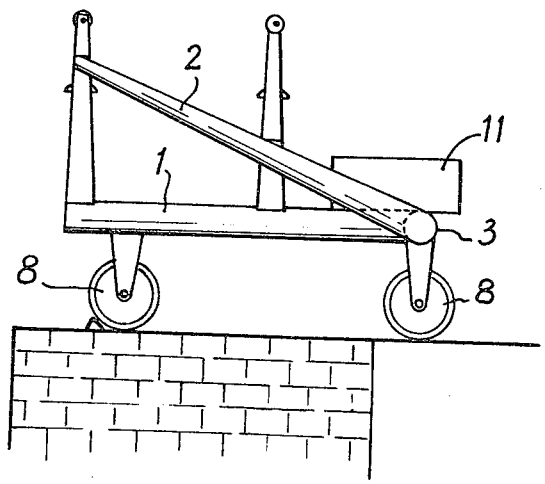
FIG. 2 is a side elevation of the same apparatus.

A hoisting apparatus according to the invention comprises two booms 1, 2 respectively, which are connected at one of their ends by a cross member 3. Each boom is provided with two uprights 4 and 5 which are spaced in the longitudinal direction; the uprights are arranged in corresponding pairs in the transverse direction from one boom to the other and are each provided with a pulley 6 at the top. A metal cable coming from a winch passes over each pulley 6 and makes it possible to raise and lower a pair of straps 7 which pass under the hull of the boat to be lifted. This part of the hoisting apparatus is conventional and well known and will not be described in detail.

According to the invention, the entire structure rests on the ground by means of only three wheels 8 which are associated with the cross member 3 and with only one of the two booms 1, 2. For example, in the embodiment illustrated, two wheels 8 are placed beneath the cross member 3 and one wheel 8 is placed beneath the boom 1 not far from its free end. The boom 2 is totally without wheels or any means for supporting it on the ground. A counterweight 9 is located in the part of the structure supported directly by the wheels 8. It is preferable to place the counterweight 9 in or near the angle 10 formed by the boom 1 and the cross member 3 which are associated with the wheels 8. It is particularly advantageous to make the booms and the cross member from tubes and to house the counterweight 9 inside these tubes in the branches of the angle 10. It is also advisable to position the propulsion and hoisting motor or motors and the hoisting winch diagrammatically shown by a rectangle 11 in the figures, in the angle 10. Preferably, the wheels 8 which support the cross member 3 are drive and guide wheels. However, the invention does not stipulate the precise arrangement or type of wheels 8 provided that one of the booms has no wheels at all.

The boom 2 which is not directly supported by wheels may be of any desired form. It may be exactly symmetrical to the boom 1 and have the same uprights 4 and 5. However, it is preferable to reduce the weight of the overhanging part, e.g. by using a boom 2 which is arranged slanting upwards, thus reducing the size and hence the weight of the uprights 4, 5. Any other equivalent arrangement may be used for this purpose.

Figure 3:
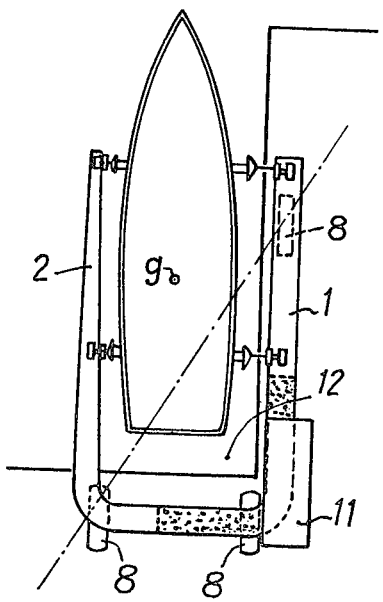
FIG. 3 is a view from above of the same hoisting apparatus being used to place a pleasure boat in the water.

FIG. 3 shows the hoisting apparatus of the invention in use and clearly illustrates the considerable advantages it brings. No special permanent construction is required. An existing angle 12 which can be found in any wet dock or formed by a quay and where the boats can be berthed enables boats to be lifted out of or lowered into the water using the apparatus according to the invention. The counterweight 9 should be designed so that, taking into account the position of the centre of gravity g of the boat and the weight of the boat, the perpendicular from the centre of gravity of the hoisting apparatus and boat combined passes within the support polygon defined by the three wheels 8.

Figure 4:
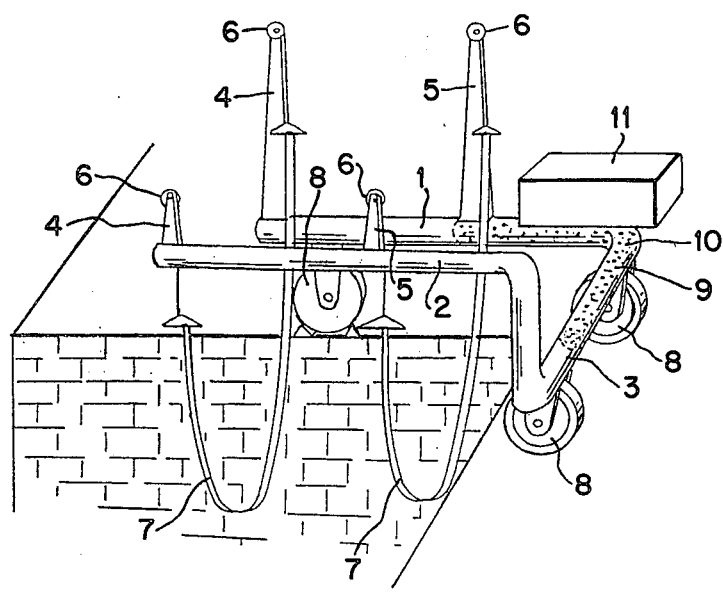
FIG. 4 is a general perspective view of a hoisting apparatus in accordance with a modification of the invention.

It will be appreciated from FIG. 4 that the invention also covers the embodiment wherein the boom 2 which is not directly supported by the wheels first of all rises vertically, from the cross member 3, or at a steep incline, up to the level of the tops of the uprights 4, 5 and then extends horizontally. This boom 2 is thus directly provided with pulleys 6 for raising the boats, opposite the pulleys 6 on the uprights 4 and 5 of the boom 1.

I claim:

1. Apparatus for hoisting a boat comprising first and second booms, a cross member connected to and spacing said first and second booms from one another at a first end thereof to provide an open-ended structure adapted to receive said boat via the open end thereof, boat support means for supporting said boat mounted by said first and second booms, at least three wheels for supporting said open-ended structure, said wheels being mounted with respect to only said first boom and the cross member, said wheels being disposed at the apexes of an imaginary triangle where the perpendicular from the center of gravity of the boat itself, when supported by said boat support means, passes outside said imaginary triangle, and a counterweight located in the part of the structure supported by the wheels so that the perpendicular from the center of gravity of the combined hoisting apparatus and boat passes through said imaginary triangle.

2. Hoisting apparatus according to claim 1, wherein the counterweight is located in the angle formed by the first boom and the cross member with which the wheels are associated.

3. Hoisting apparatus according to claim 1, wherein the cross member is supported by two wheels which are drive and guide wheels.

4. Hoisting apparatus according to claim 3 further comprising means for driving the hoisting apparatus and hoisting the boat including a propulsion motor, a hoisting motor and a winch which are located in the same zone as the counterweight.

5. Hoisting apparatus according to claim 1, wherein said booms and the cross member are tubes and the counterweight is housed inside these tubes.

6. Hoisting apparatus according to claim 1, wherein said second boom, which is not supported by the wheels, slants upwards from the cross member.

7. Hoisting apparatus according to claim 1, further comprising uprights carried by said first boom, said second boom extending upwardly from the cross member up to the level of the tops of said uprights and then extending horizontally at this level, and pulleys for raising boats fitted directly onto said second boom.

8. Apparatus as in claim 1 including first means for controlling said boat support means to hoist said boat and second means for propelling said apparatus, said first and second means being located in the same general area as said counterweight to further ensure that said perpendicular passes through said imaginary triangle.

9. Apparatus as in claim 1 where said open-ended structure is generally U-shaped in plan view.

10. Apparatus as in claim 1 where there are only three of said wheels.

11. Apparatus as claim 1 where there is no support member for the open-ended structure mounted on said second boom.

12. Apparatus as in claim 1 including a boat supported by said boat supporting means.

* * * * *